T. Harrison,
Horse Power.
N° 62,030. Patented Feb. 12, 1867.
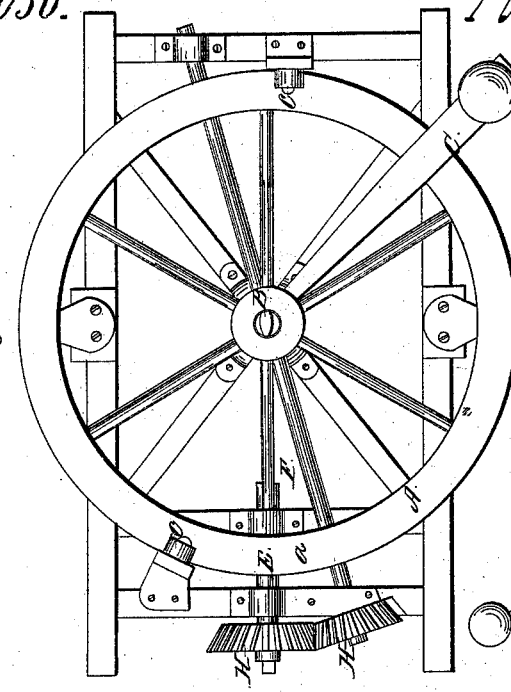
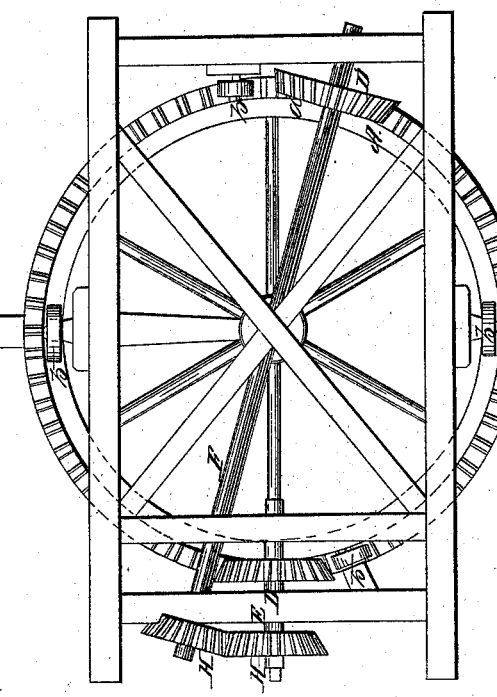
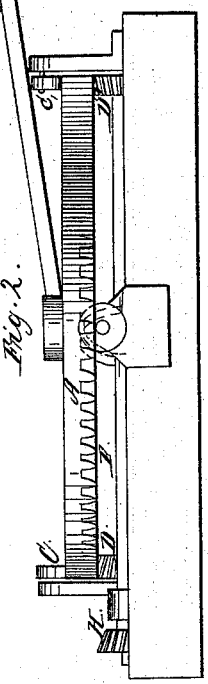
Witnesses:
Inventor:
Theoph Harrison
Per Munn & Co
Attorneys

United States Patent Office.

THEOPHILUS HARRISON, OF BELLEVILLE, ILLINOIS, ASSIGNOR TO HIMSELF AND WILLIAM C. BUCHANAN, OF SAME PLACE.

Letters Patent No. 62,030, dated February 12, 1867.

IMPROVEMENT IN HORSE-POWER.

*The Schedule referred to in these Letters Patent and making part of the same.*

TO ALL WHOM IT MAY CONCERN:

Be it known that I, THEOPHILUS HARRISON, of Belleville, in the county of St. Clair, and State of Illinois, have invented a new and improved Horse-Power; and I do hereby declare that the following is a full, clear, and exact description thereof, which will enable those skilled in the art to make and use the same, reference being had to the accompanying drawings, forming part of this specification, in which—

Figure 1 is an inverted plan of my invention.

Figure 2, a side view of the same.

Figure 3, a plan or top view of the same.

Similar letters of reference indicate corresponding parts.

This invention is designed to obviate the great loss of power caused by friction in transmitting the power of the horse or horses to the machinery to be driven. In the single-pinion horse-powers a great deal of friction is produced by the pressure of the master-wheel on its pin or axis, and in double-pinion powers, as well as others designed to obviate the friction above specified, the arrangement of the gearing, together with its complexity, produces as much friction as is saved by the relieving of the pressure of the master-wheel on its pin or axle. Our invention, it is believed, obviates friction on the pin or axle of the master-wheel, and without creating any elsewhere.

A represents the master-wheel, which is fitted on a central pin or axis, B, and has its rim a resting upon friction-rollers b and guide-rollers c, bearing upon the upper surface of said rim. The wheel A has levers or sweeps C secured radially to it, the draught animals being attached to said levers or sweeps; and said wheel is provided with pendent teeth, which gear into pinions D D', one of which, D, is on a short shaft, E, and the other shaft, D', on a long shaft F, extending entirely across the frame G, the two pinions D D' being at opposite sides of the wheel A; and the two shafts E F connected by pinions H H. By this arrangement it will be seen that when the master-wheel A is rotated the central pin or axis B will be relieved of the pressure of the wheel A on account of its action upon the two pinions D D' at opposite sides of B, and as the pinions D D' are on separate or independent shafts E F, and the latter connected by pinions H H, the power from the master-wheel A is transmitted to said shafts with the least possible amount of friction. I am aware that a horse-power, composed of a master-wheel gearing into pinions at opposite sides of its pin or axle, is now in use, but in this case both pinions are placed on one and the same shaft, and one pinion placed loosely on said shaft, so that it may rotate in a reverse direction to the other. This occasions considerable friction. Other modes have been devised with a more complex arrangement of gearing, but they create a proportionably greater degree of friction in their operation. In order to compensate for any irregularity in the gearing, I have the pin or axle B of the master-wheel A of elliptical or oval form in its horizontal section, (see fig. 3,) the major diameter of the pin or axle being about, or nearly, in line with the shaft F, and the hole in the hub of wheel A of circular form. This admits of a lateral play of wheel A, and prevents all binding of the gearing and unnecessary wear and friction.

Having thus described my invention, what I claim as new, and desire to secure by Letters Patent, is—

The arrangement of the pinion D and the pinion D', shaft F, and pinion H, diagonally with the pinion H' and shaft E, in combination with the master-wheel A, constructed and operating in the manner and for the purpose herein specified.

I also claim the elliptical or oval pin or axle B of the master-wheel A, in connection with the two pinions D D' and separate shafts E F, substantially as and for the purpose set forth.

THEOPHILUS HARRISON.

Witnesses:
 JAMES AFFLECK,
 AMOS THOMPSON.